UNITED STATES PATENT OFFICE.

ERNST ZEHNTNER, OF BASEL, SWITZERLAND, ASSIGNOR TO DYE WORKS, FORMERLY L. DURAND, HUGUENIN & CO., OF BASEL, SWITZERLAND.

DISAZO DYESTUFFS AND PROCESS OF MAKING SAME.

1,075,134.  Specification of Letters Patent.  Patented Oct. 7, 1913.

No Drawing.  Application filed December 10, 1912.  Serial No. 735,963.

*To all whom it may concern:*

Be it known that I, ERNST ZEHNTNER, doctor of philosophy and chemist, a citizen of the Swiss Republic, and resident of Basel, Switzerland, have invented New Disazo Dyestuffs and a Process of Making Same, of which the following is a full, clear, and exact specification.

United States Letters Patent 329638 and 394841 disclose the manufacture of disazo dyestuffs by coupling tetrazodiphenyl with salicylic or ortho-cresotinic acid. These dyestuffs are very sparingly soluble and are only gradually absorbed by cotton. On account of their sparing solubility they have found no application for cotton printing, as they yield only unimportant tints which have but little resistance to soap.

According to the present invention by coupling tetrazotized benzidin-2:2'-disulfonic acid with an oxycarboxylic acid of the benzene series, such as salicylic acid or orthocresotinic acid, yellow disazo dyestuffs are obtained which correspond to the formula:

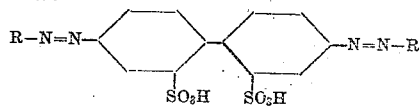

(in which R stands for the radical of an ortho-oxy-carboxylic acid of the benzene series) and are in form of their alkali salts suitable for the purposes of dyeing as well as, in particular, for cotton printing on account of their easy solubility and their remarkable fastness. This result was unexpected, as the dyestuffs from benzidin and salicylic acid or orthocresotinic acid, in spite of their sparing solubility, are but little fast to soap when used in cotton printing; indeed it was anticipated that by introducing two sulfonic groups, the dyestuffs would be still less fast to soap. The new dyestuffs are, however, remarkably fast to soap, soda, chlorin, light and surpass in these properties all hitherto known azo dyestuffs used in cotton printing.

A particularly valuable property of the new dyestuffs is that when they have been printed and steamed, washing with water removes absolutely no dyestuff, that is to say the washing water remains colorless.

The following example illustrates the invention: 34.4 kilos of benzidin-2:2'-disulfonic acid

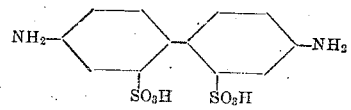

are dissolved in 300 liters of water with aid of 8 kilos of caustic soda or 10.6 kilos of calcined sodium carbonate and after addition of a concentrated solution of 14 kilos of sodium nitrite the whole is poured into a mixture of 50 kilos of hydrochloric acid of 22° Bé. and 100 kilos of ice, while stirring well, and maintaining the temperature at about 3°–5° C. by adding ice. The greater part of the tetrazodiphenyldisulfonic acid separates. When the pouring is at an end the stirring is continued for some time and then the thin paste is introduced into a cold solution of 28 kilos of salicylic acid in 30 kilos of calcined sodium carbonate and 150 liters of water. The coupling is finished in known manner by addition of caustic soda lye and the dyestuff is salted out, filtered and dried.

The dyestuff which corresponds to the formula

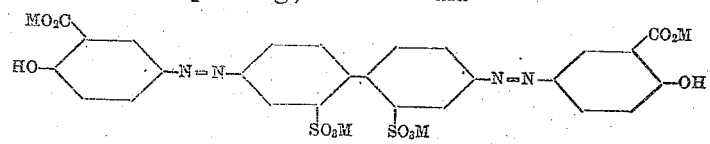

(in which M stands for an alkali metal) is a yellow powder easily soluble in water and dyeing wool vivid yellow tints. With chromium mordants there are produced on cotton a bright yellow such as cannot be obtained with any other dyestuff.

What I claim is:

1. The herein described process for the manufacture of disazo dyestuffs consisting in combining the tetrazo derivative of benzidin-2:2'-disulfonic acid with ortho-oxy carboxylic acids of the benzene series.

2. The herein described process for the manufacture of disazo dyestuffs consisting in combining 1 molecule of the tetrazo derivative of benzidin-2.2'-disulfonic acid with two molecules of salicylic acid.

3. As new products the described disazo dyestuffs being alkali salts of the products corresponding to the general formula

(in which R stands for the radical of an ortho-oxy-carboxylic acid of the benzene series) suitable for the purposes of dyeing as well as for cotton printing, constituting in dry state yellow powders easily soluble in water, dyeing wool and chromium mordanted cotton yellow tints, remarkably fast to soap, soda, chlorin, light and washing.

4. As a new article of manufacture the described disazo dyestuff derived from benzidin-2.2'-disulfonic acid and salicylic acid, suitable for the purposes of dyeing as well as for cotton printing and constituting in dry state a yellow powder easily soluble in water, dyeing wool vivid yellow tints and mordanted cotton bright yellow tints remarkably fast to soap, soda, chlorin, light and washing.

In witness whereof I have hereunto signed my name this 29th day of November, 1912, in the presence of two subscribing witnesses.

ERNST ZEHNTNER.

Witnesses:
 GEO. GIFFORD,
 AMAND RITTER.